(12) United States Patent
Sfez

(10) Patent No.: US 9,343,864 B2
(45) Date of Patent: May 17, 2016

(54) HIGH POWER PLANAR LASING WAVEGUIDE

(75) Inventor: Bruno Sfez, Jerusalem (IL)

(73) Assignee: Soreq Nuclear Research Center, Yavne (IL)

(*) Notice: Subject to any disclaimer, the term of this patent is extended or adjusted under 35 U.S.C. 154(b) by 0 days.

(21) Appl. No.: 13/984,535

(22) PCT Filed: Feb. 9, 2012

(86) PCT No.: PCT/US2012/024395
§ 371 (c)(1),
(2), (4) Date: Aug. 9, 2013

(87) PCT Pub. No.: WO2012/109400
PCT Pub. Date: Aug. 16, 2012

(65) Prior Publication Data
US 2013/0314770 A1    Nov. 28, 2013

Related U.S. Application Data

(60) Provisional application No. 61/441,332, filed on Feb. 10, 2011.

(51) Int. Cl.
*H01S 3/067* (2006.01)
*H01S 3/063* (2006.01)
*H01S 3/16* (2006.01)
*H01S 3/042* (2006.01)
*H01S 3/0941* (2006.01)
(Continued)

(52) U.S. Cl.
CPC ............ *H01S 3/06754* (2013.01); *H01S 3/063* (2013.01); *H01S 3/1603* (2013.01); *H01S 3/042* (2013.01); *H01S 3/0637* (2013.01); *H01S 3/0941* (2013.01); *H01S 3/10007* (2013.01); *H01S 3/10053* (2013.01); *H01S 3/1307* (2013.01); *H01S 3/1317* (2013.01); *H01S 3/2308* (2013.01); *H01S 3/2383* (2013.01)

(58) Field of Classification Search
CPC ... H01S 3/063; H01S 3/06754; H01S 3/1603; H01S 3/10053; G02B 2006/1208
USPC ..................................... 359/333, 341.33, 349
See application file for complete search history.

(56) References Cited

U.S. PATENT DOCUMENTS 5,119,460 A * 6/1992 Bruce et al. ................. 385/142
5,726,796 A * 3/1998 Regener et al. ............ 359/341.2
(Continued)

FOREIGN PATENT DOCUMENTS

| JP | 3284733 | 12/1991 |
| JP | 5283770 | 10/1993 |
| JP | 2005-268732 | 9/2005 |

OTHER PUBLICATIONS

Love et al. "Asymmetric, adiabatic multipronged planar splitters", Optical and Quantum Electronics vo. 28, pp. 353-369 (1996).*
(Continued)

*Primary Examiner* — Eric Bolda
(74) *Attorney, Agent, or Firm* — Dekel Patent Ltd; David Klein

(57) ABSTRACT

A planar optical waveguide amplifier includes an active optical waveguide (203) containing rare-earth ions embedded in a passive optical waveguide (202) that guides the pump power.

12 Claims, 14 Drawing Sheets

(51) Int. Cl.
*H01S 3/10* (2006.01)
*H01S 3/13* (2006.01)
*H01S 3/131* (2006.01)
*H01S 3/23* (2006.01)

(56) References Cited

U.S. PATENT DOCUMENTS

| | | | |
|---|---|---|---|
| 5,870,417 A * | 2/1999 | Verdiell et al. | 372/32 |
| 6,236,793 B1 * | 5/2001 | Lawrence et al. | 385/132 |
| 6,650,818 B2 * | 11/2003 | Gao | 385/132 |
| 7,027,212 B2 * | 4/2006 | Frolov et al. | 359/333 |
| 2002/0131746 A1 * | 9/2002 | Bayramian et al. | 385/131 |
| 2003/0081880 A1 * | 5/2003 | Tegge et al. | 385/15 |
| 2003/0123806 A1 * | 7/2003 | Erben | 385/50 |
| 2004/0257639 A1 * | 12/2004 | Frolov et al. | 359/333 |
| 2005/0024716 A1 * | 2/2005 | Nilsson et al. | 359/341.31 |
| 2005/0105854 A1 * | 5/2005 | Dong et al. | 385/46 |
| 2005/0265647 A1 * | 12/2005 | Vakhshoori et al. | 385/4 |
| 2006/0204188 A1 * | 9/2006 | Clarkson et al. | 385/123 |

OTHER PUBLICATIONS

PCT Written Opinion PCT/US20121024395, Jul. 2, 2012 (contains English abstracts of the three JP documents cited above).

* cited by examiner

SURFACE TEMPERATURE

HIGH POWER PLANAR LASING WAVEGUIDE

CROSS-REFERENCE TO RELATED APPLICATIONS

This application is a national phase application of PCT patent application PCT/US2012/024395, filed 9 Feb. 2012, which claims priority under 35 USC §119 to U.S. Provisional Patent Application, Ser. No. 61/441332, filed 10 Feb. 2011, which are incorporated herein by reference.

FIELD OF THE INVENTION

The present invention relates generally to a planar optical waveguide amplifier.

BACKGROUND OF THE INVENTION

There is a strong need for fiber lasers because of their ease of use, low operating cost, versatility and high beam quality they provide. However, several problems hamper their even wider use, especially for high power applications. First, the assembly of fiber lasers and amplifiers still requires highly qualified professionals and a large amount of manual handling. Second, at high power levels, impurities or doping elements in the fiber lead to fiber darkening, which finally result in fiber damage and system failure. Third, even in non-doped fibers, intrinsic silica optical nonlinearity leads to different nonlinear effects such as Brillouin scattering. These nonlinear effects prevent light from propagating in the fiber and result in system failure.

In order to improve the current situation, fiber laser manufacturers employ different techniques, such as material improvement (e.g., reduction of the nonlinear coefficient, reduction of photo-darkening through suitable fiber treatment), and fiber improvement (e.g., large core area fibers allowing reducing the power density in the fiber core; photonic crystal fibers where part of the field is located in air pores within the fiber).

The relative high cost of fiber lasers manufacturing is still not solved, and the cost per watt of such lasers remains among the highest in the industry.

An alternative that has been developed by several groups is the replacement of the fiber by a planar waveguide. Planar waveguides usually suffer from higher losses but present the advantage of low fabrication cost since it is possible to use standard microelectronic processes in order to manufacture them. Using standard processes, it is possible to grow silica films on different types of substrates. However, in this case the silica layer is limited to a few microns thickness and the resulting waveguides cores have a small cross-section, which prevent using them for high power applications.

It has been suggested (Masaki Kohtoku et al, New waveguide fabrication techniques for next-generation PLC, NTT technical review, vol. 3, no 7, July 2005) that thick layers of silica can be obtained if a flame hydrolysis deposition (FHD) technique is used. FHD is a standard process for obtaining fiber pre-forms and the technique does not limit the deposition thickness. This is due to the fact that the technique requires two phases: deposition of a highly porous layer of silica and sintering of the layer in order to obtain a compact silica layer.

The sintering process has been thoroughly studied for the fiber fabrication. In the case of planar waveguides, the process is necessarily different since there is the presence of a substrate, and therefore large temperature changes during the sintering process generate constraints within the layer, which must be reduced at maximum. Different groups have realized such waveguides on a silicon substrate. The disadvantage of silicon substrates is that the silicon index of refraction is particularly high, and part of the light propagating in the silica core is evanescently captured by the silicon substrate and absorbed there. At low power, this results in losses. At high power, it might also result in substrate heating and finally device failure.

It is therefore more convenient to have a whole glass or crystal technology. This has been realized in some cases by bonding planar wafers together (D. P Shepherd et al, High power planar dielectric waveguide lasers, Journal of Physics D, 2001, vol. 34, page 2420). However this technique does not use microelectronics techniques and therefore does not lead to cost reduction. Moreover, it is more limited in the design options.

SUMMARY OF THE INVENTION

The present invention seeks to provide a planar optical waveguide amplifier, as is described more in detail hereinbelow.

The waveguide amplifier includes a single mode optical waveguide containing rare-earth ions embedded in a larger and wider main passive optical waveguide that guides the pump power. Several similar secondary passive waveguides transport pump light from the pump laser diodes to the main passive waveguide in order to obtain a distributed pumping of the active waveguide. The active waveguide is split into several active waveguides that are pumped independently and then recombined. The phase of the different waveguides is adjusted by properly heating them. Light is coherently recombined so that the recombined beam is single mode.

The structure of the waveguide is analogous to the structure of a fiber laser or amplifier. The laser material (usually a rare-earth ion such as ytterbium or erbium) is located in the waveguide core. The lasing process is obtained by optically pumping the core at the suitable optical wavelength. The pumping light is optically guided in a waveguide, the first clad waveguide, into which the core waveguide is embedded.

Light from the pump diode is guided towards the first clad waveguide using a multimode waveguide. Each pump diode pumps a different region of the active region, leading to a distributed pumping scheme.

In order to avoid nonlinear effects and photo-darkening, the laser or amplifier is divided into several branches that are recombined at the output. Each branch comprises a pumping waveguide and a core waveguide embedded in the pumping waveguide. The division and recombination architecture are such that the optical guiding process is not perturbed and minimal losses are added. The phase of each individual waveguide is controlled by modifying the respective pump power level injected in the surrounding pumping waveguide.

BRIEF DESCRIPTION OF THE DRAWINGS

The present invention will be understood and appreciated more fully from the following detailed description taken in conjunction with the drawing in which.

DETAILED DESCRIPTION OF EMBODIMENTS

The present invention includes a laser or optical amplifier based on a double network of double clad planar waveguides: an active waveguide network and a pumping waveguide network.

Figure 1:
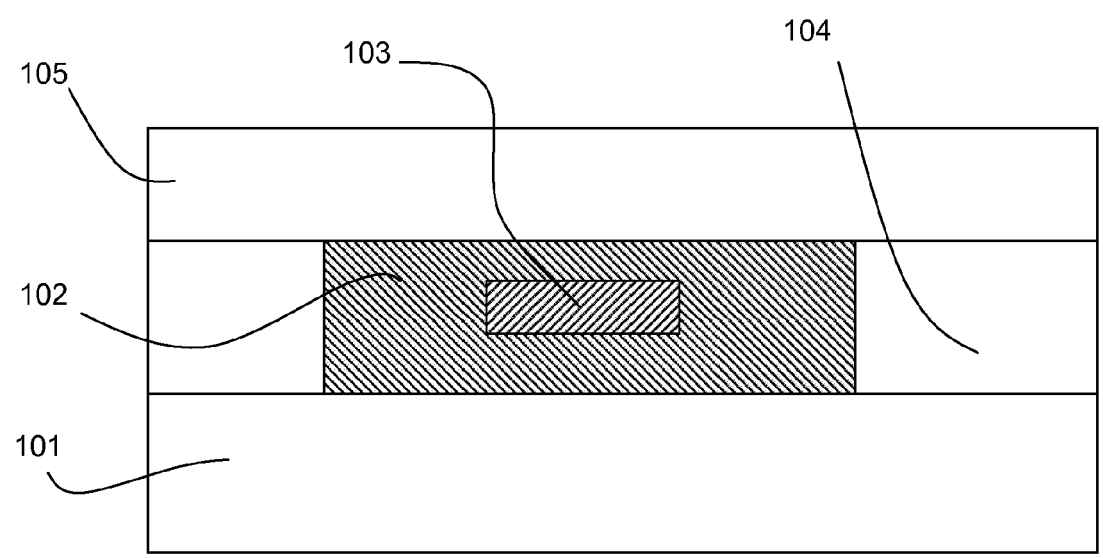
FIG. 1 is a simplified illustration of a structure of a double clad waveguide, in accordance with an embodiment of the present invention.

Reference is made to FIG. 1. The double clad waveguide structure includes a glass substrate 101 of index nS, the pumping clad waveguide 102 with index nP, the active waveguide 103 with index nA. The structure is embedded in a low index material 104, for providing proper light guiding, which can be either a low-index polymer or air, refractive index nL. The structure is protected by a glass cover 105. The refractive indices obey the relationship nL, nS<nP<nA.

Since pumping waveguide 102 is largely multimode, the refractive index of the surrounding medium can be much lower than the refractive index of the clad itself. For example, the medium can be air. The second waveguide 103, the active waveguide, is embedded within pumping waveguide 102. Waveguide 103 is operated either as a single mode waveguide or as a few modes waveguide. Its refractive index is slightly higher than the refractive index of pumping waveguide 102. It should be noted that the entire length of active waveguide 103 is embedded within pumping waveguide 102, so that the refractive index difference between active waveguide 103 and the surrounding medium is the same.

Figure 2:
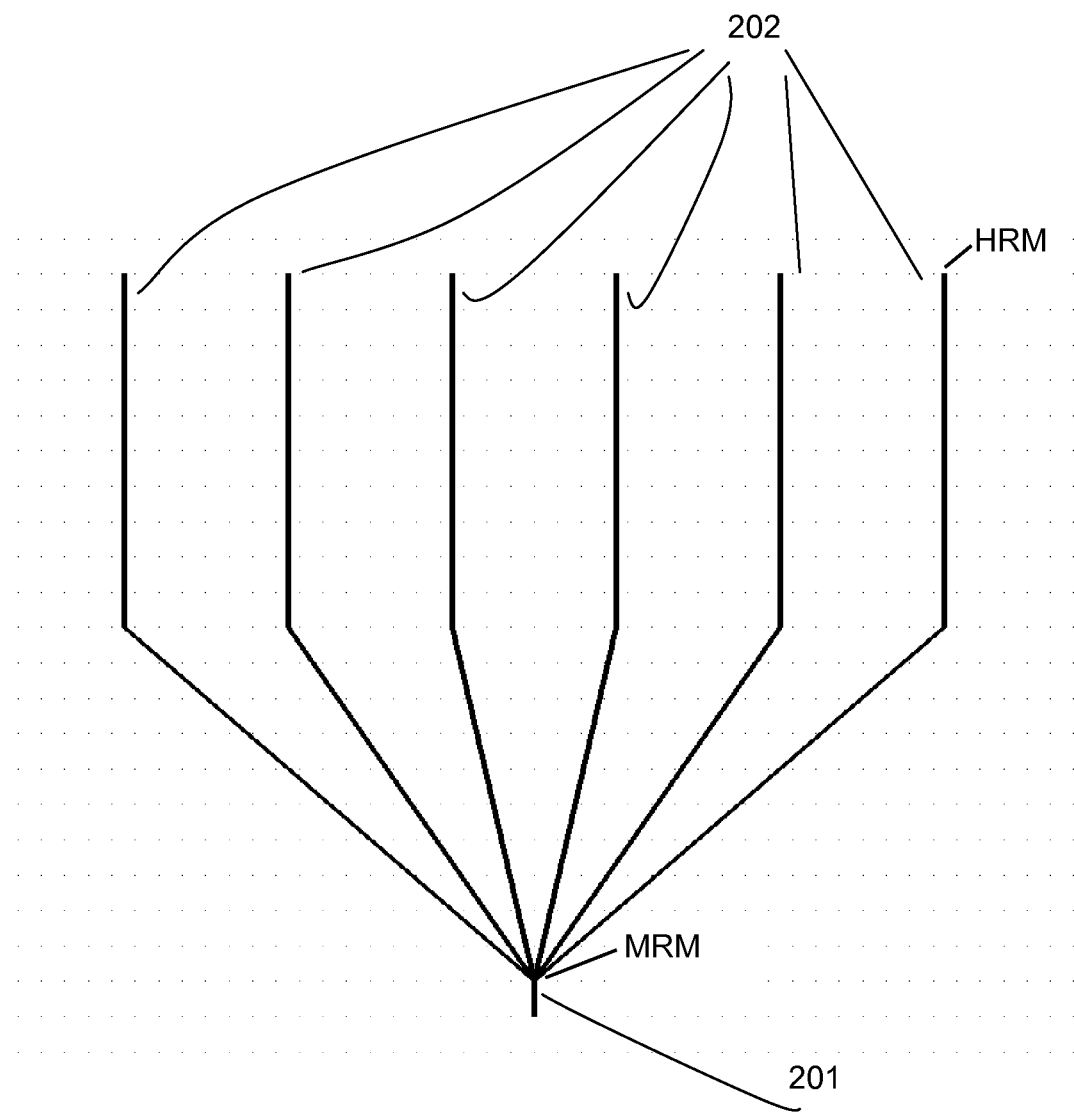
FIG. 2 is a simplified illustration of a single tree active waveguide network architecture, in accordance with an embodiment of the present invention, only the skeleton of the active waveguide network being shown.

The active waveguide network includes a single tree as shown in FIG. 2. Each branch includes a pumping waveguide and an active waveguide embedded within the pumping waveguide, as described above. Light from the active waveguide 201 is split into several branches 202 (here 6, although this number is not restricting). The split is adiabatic. In this particular, non-limiting case the length of the device is 20 cm and its width (distance between the most left and most right branches) is 600 microns. Light exiting the different branches either is recombined in free space or is reflected back and finally exits through segment 201. It should be noted that the lengths of the branches differ by a multiple of the signal wavelength (the multiple can be, and is typically, zero).

The active network includes an input waveguide 201 and a series of branches 202 forming small angles with input waveguide 201. Light coupled in the input active waveguide then divides between the different branches. This light is amplified in each branch independently but the phase relationship of the light between the different branches remains approximately the same during the propagation. A feedback mechanism is further described in order to finely adjust this phase difference.

In the first embodiment the different branches end as a comb forming a waveguide array. For a suitable pitch of the waveguide array, the set of waveguides acts as a phase array, similarly to array waveguide gratings developed for optical telecommunications. Light exiting the phase array can be focused into an optical fiber for beam delivery by suitably arranging the phases between the electromagnetic fields exiting the different waveguides. The output beam is an amplified version of the input beam. In this way, high power levels are never present in each branch, therefore reducing nonlinear effects and photo-darkening.

In a second embodiment a high reflectivity mirror HRM is deposited on the facet of the output waveguides 202 (this can also be a Bragg grating or a volume Bragg grating tuned to a specific wavelength) and a medium reflectivity mirror MRM is deposited on the facet of the input waveguide 201. When pumping is activated, the device acts as a laser and light exits through the waveguide 201. In order to reduce photo-darkening effect in the input waveguide, it is preferable not to dope it, and to make it as short as possible in order to avoid nonlinear effects.

Figure 3:
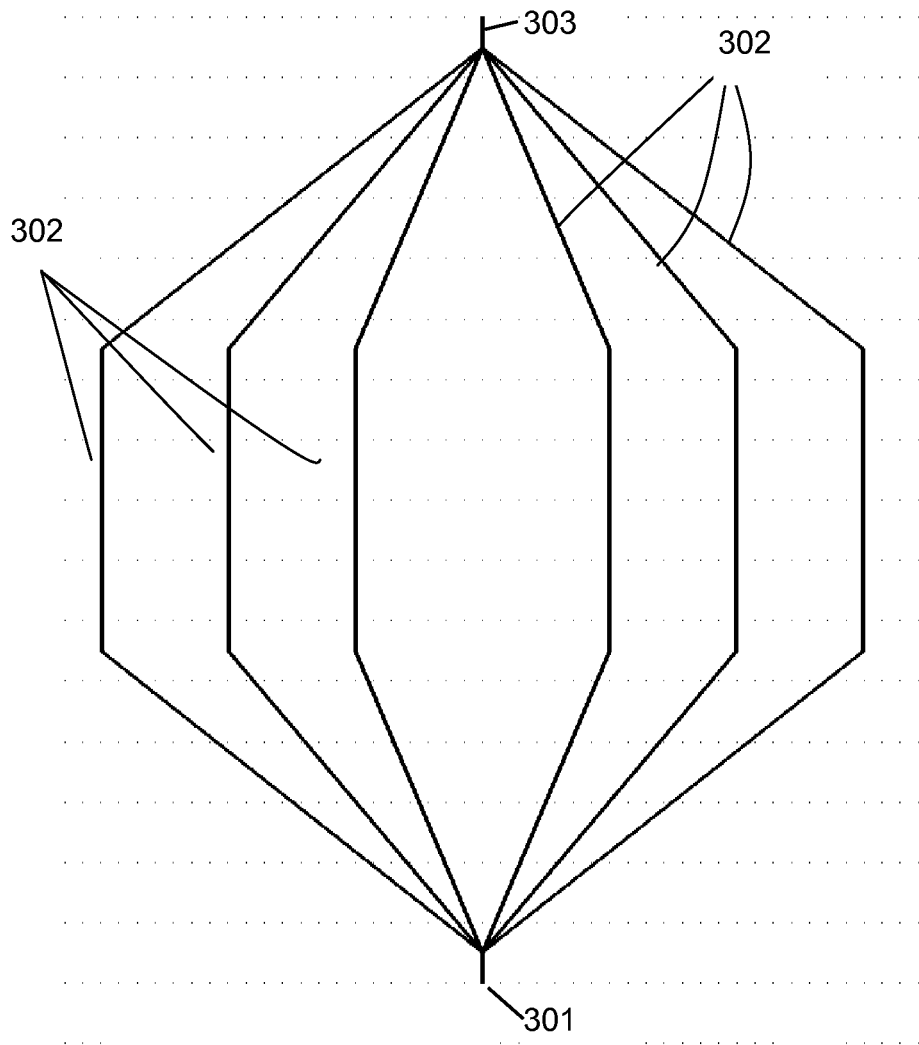
FIG. 3 is a simplified illustration of a double tree active waveguide network architecture, in accordance with an embodiment of the present invention, only the skeleton of the active waveguide network being shown.
Figure 4:
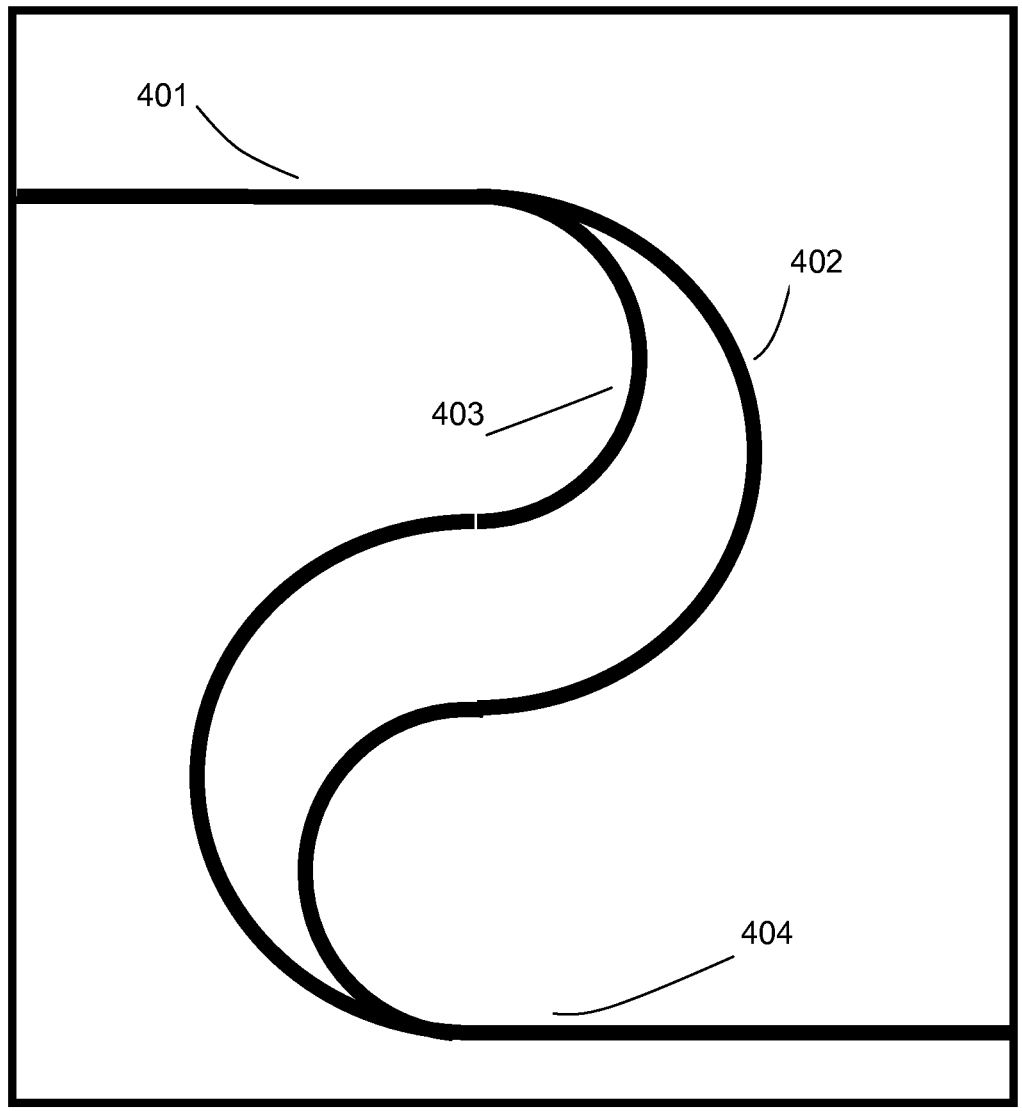
FIG. 4 is a simplified illustration of an exemplary implementation of the double tree that keeps the length of both branches identical.

FIG. 3 illustrates a third embodiment, wherein the active waveguide network includes a double tree. Light from an active waveguide 301 is split into several branches 302 (here 6, although this number is not restricting). The split is adiabatic. It should be noted that the optical lengths of the branches are preferably the same. Light is split, then recombined at waveguide segment 303 and reflected back into the waveguide to active waveguide 301. The advantage of this configuration is that the beams are recombined on the wafer itself and there is more flexibility for the geometry. In a fashion similar to the single tree configuration, all the waveguides are double-clad waveguides, as described above. The physical implementation of this scheme requires that all the different waveguides have the same length. One example of such implementation is given in FIG. 4. The same concept can be extended to more than two branches. Light propagates in the region 401 and then is split in waveguides 402 and 403. These two waveguides have exactly the same length. Light is then recombined in the segment 404.

Figure 5:
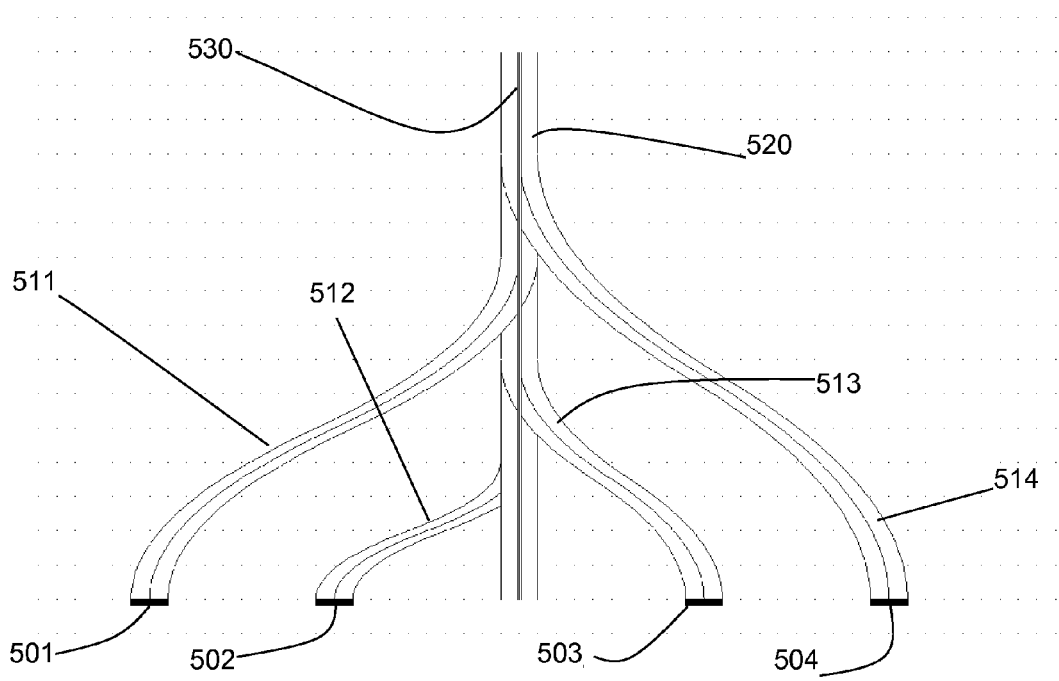
FIG. 5 is a simplified illustration of pump combination, in accordance with an embodiment of the present invention.

Reference is now made to FIG. 5, which illustrates structure of the pumping waveguide. Light from different pump diodes 501, 502, 503 and 504 is coupled respectively in multimode waveguides 511, 512, 513, 514. Pump light from these waveguides is coupled into a central multimode waveguide (clad waveguide) 520 inside which is embedded the active waveguide 530. Pump light is absorbed along the 520 waveguide length by the active waveguide and signal propagating along the active waveguide is amplified. Light from the pump diode (for example 501) is coupled in the secondary waveguide 511. From there it couples in the director waveguide 520 and is absorbed by the active waveguide 530. When the pump level is too low, additional pump light is coupled in through another secondary waveguide 514. Therefore, the pump is distributed all over the active waveguide.

The pumping waveguide network is made of large waveguides that act as double clad for the inner active waveguide described above. In order to avoid changes in the propagation constant of the light in the active waveguide, the pumping waveguide always surrounds the active waveguide so that the surrounding index of the active waveguide is always the same. Since for some doping elements there is a pumping threshold below which the active waveguide material absorbs the signal, it is necessary to ensure minimal pumping level all over the active waveguide length.

The network is based on the following architecture rules:

1) each active waveguide segment is surrounded by a pumping waveguide (director waveguide)

2) a series of pumping waveguides (secondary waveguides) of similar characteristics as the director waveguide are branching to the director waveguide 3) The other end of each secondary waveguides is coupled to a pumping diode 4) The secondary waveguides are arranged in such a way that the transparency threshold is always reached in each portion of the active waveguide region.

Figure 6:
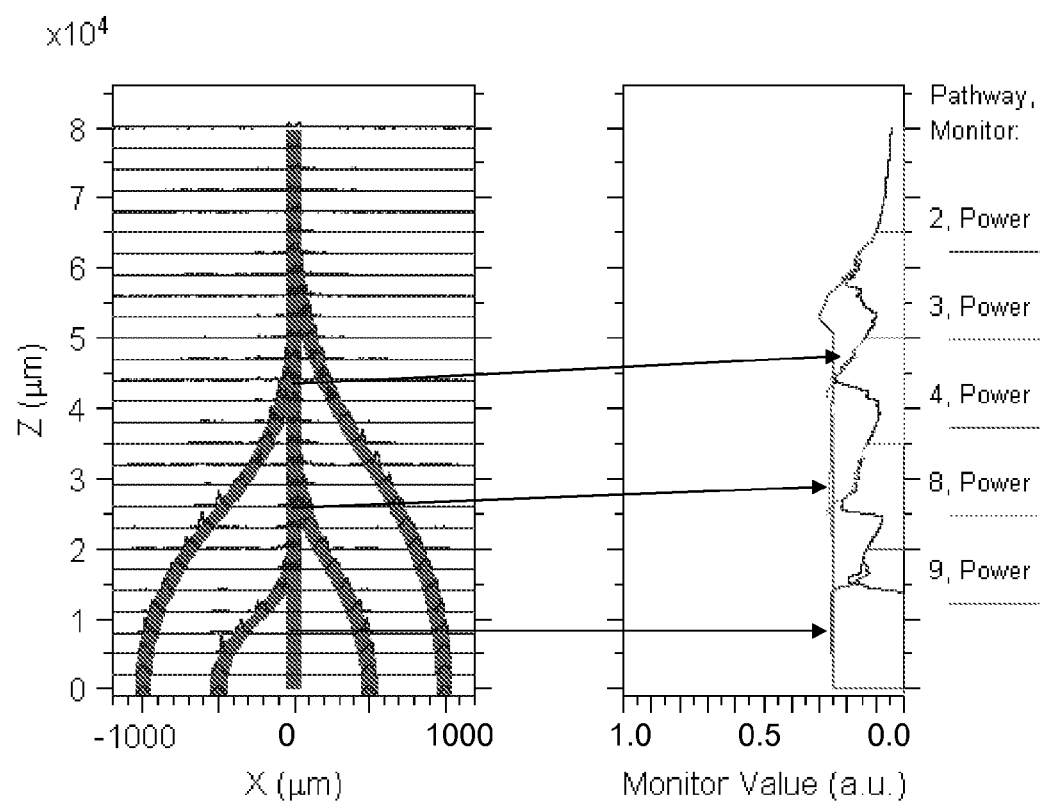
FIG. 6 is a simplified illustration of light propagation in the structure depicted in FIG. 5.

The principle of the distributed pumping scheme (computer simulation of this structure) is shown in FIG. 6. Pump light coupled into the different multimode waveguide is injected in the clad waveguide and is absorbed by the active waveguide. The graph shows the amount of pump light in the active waveguide. Once light is coupled into the clad waveguide, it gets absorbed and the pump level in that waveguide decreases. Pump light from another waveguide is then coupled into the clad waveguide and the pump level increases again. The pump level is preferably always high enough so that the active medium does not absorb the signal.

Figure 7:
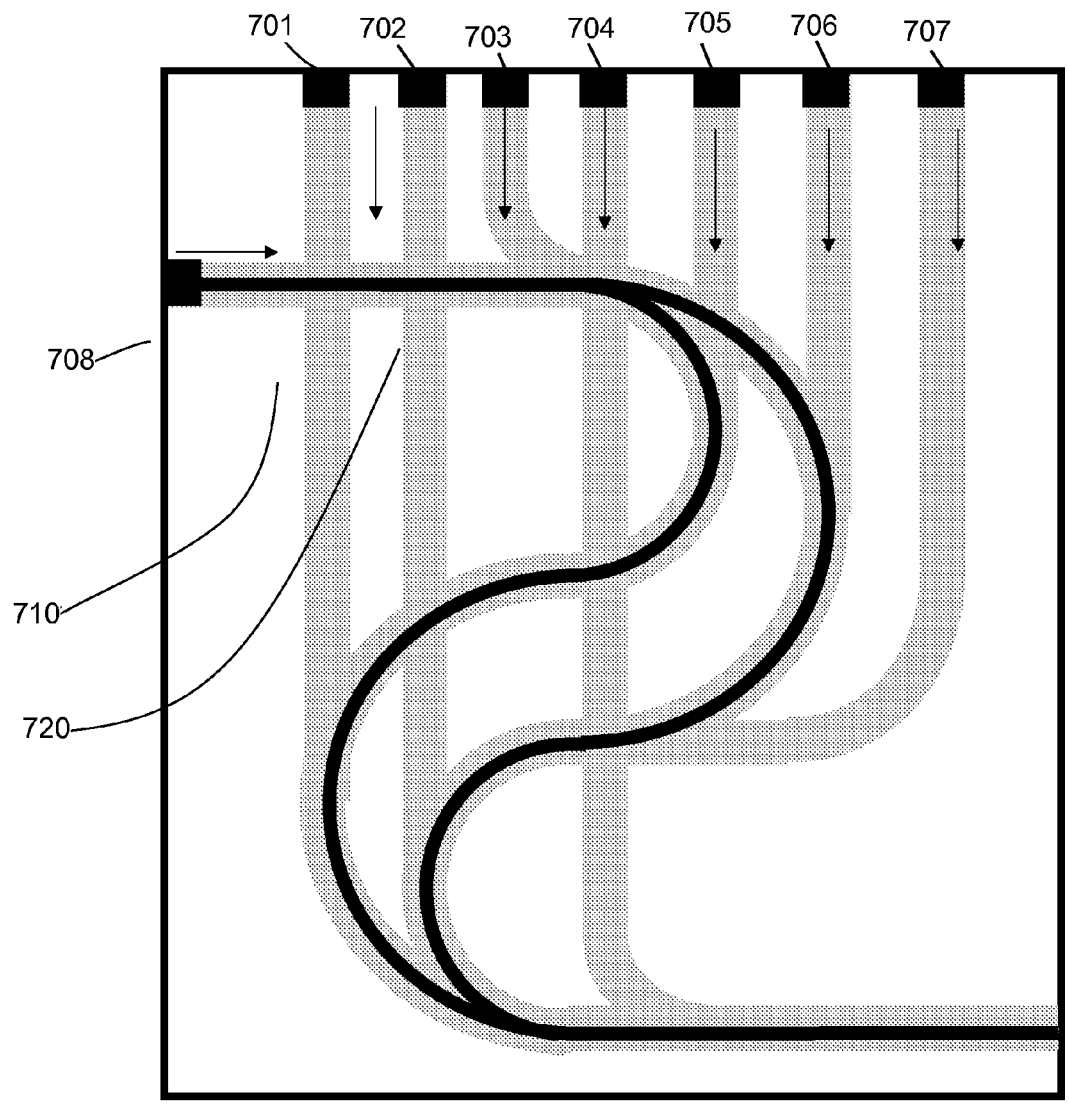
FIG. 7 is a simplified illustration of integration of the pump and signal networks.

In FIG. 7, the combination of both networks is displayed. Using this double network architecture, light from pump diodes can be coupled relatively simply to the active waveguide. In FIG. 7, the pumping diodes are distributed at equal distance one from the other and constitute a pump diode array. The different secondary waveguides are coupled into the director waveguide 720 which in turn pumps the active waveguide 730. Therefore the pumping complexity is left to the lithographic design and does not require skillful handling. Light from diodes 701 to 708 is coupled into individual multimode waveguides which are equally spaced. Diode bars can therefore be easily coupled to the different waveguides. Each pump waveguide arrives at a different region of the clad waveguide 710. This waveguide 710 then spit and each branch is pumped similarly to the main waveguide. Both branches then recombine into a single waveguide. Note the presence of the active waveguide within the clad waveguide. Note also that the active waveguide surrounding index of refraction is always the same (i.e., the index of refraction of the clad waveguide).

As mentioned before, the optical path difference between any two active waveguides must be much smaller than the wavelength in the material. Since there are lithography errors, fabrication errors and material fluctuations, this is a constraint it is difficult to fulfill without active control.

Figure 8:
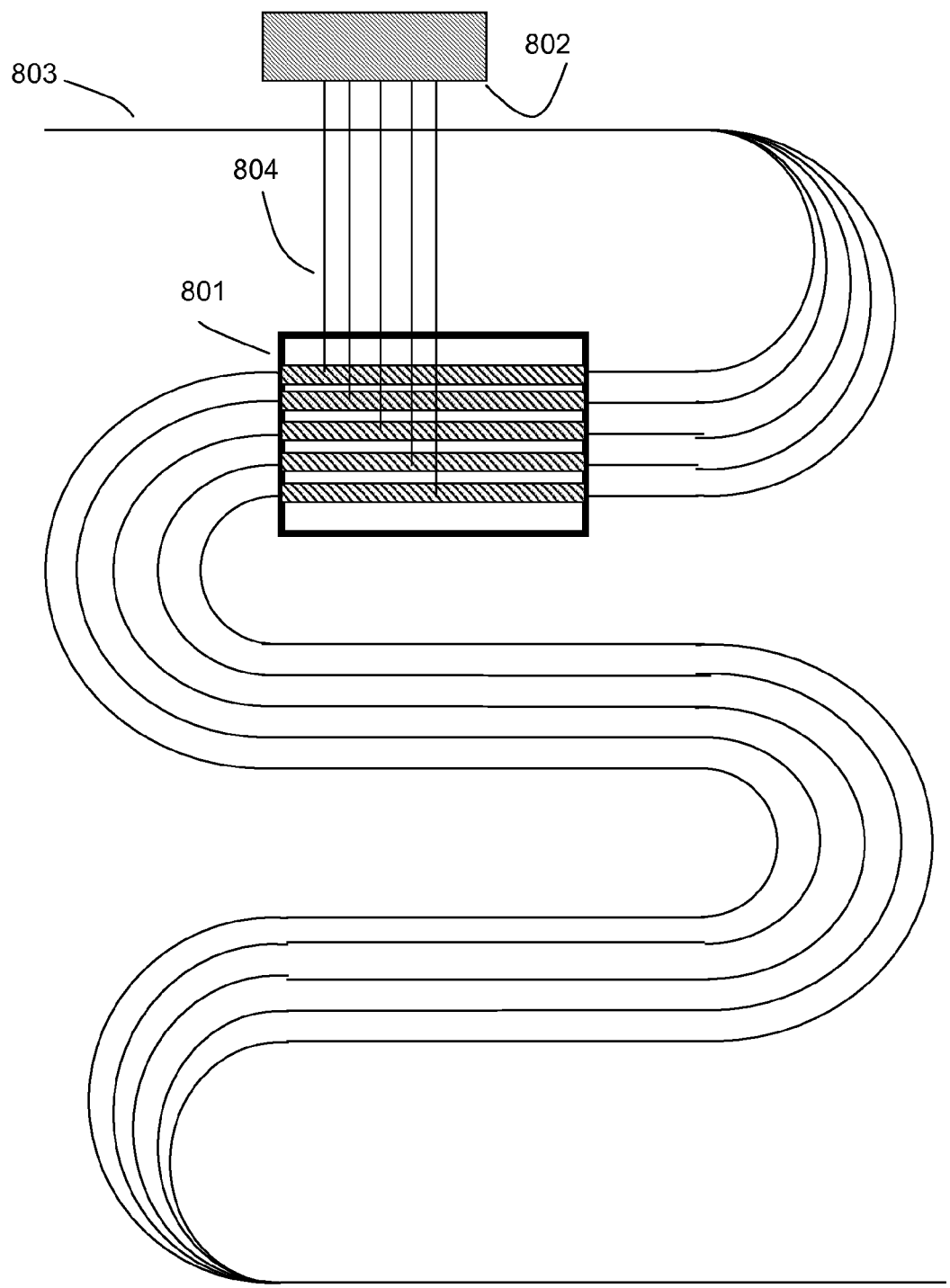
FIG. 8 is a simplified illustration of the phase control using local heaters.

In the present invention, heat induced refractive index change is the preferred means to control these fluctuations, as is shown in FIG. 8.

In the first embodiment the heater region 801 is made of resistive material deposited on the waveguides. In order to do so, the whole wafer is cooled at a temperature below the ambient temperature and this temperature is stabilized. Moreover local heaters are assigned at each active waveguide independently and are activated by a central microcontroller 802. The thermo-optical effect translates the temperature change into a phase change The interaction length of the heater and the active waveguide as well as the temperature change determine the maximum phase-shift it is possible to obtain using this technique. The heater pad is composed of one or several heater electrodes 804 per waveguide, each heater being controlled independently by microcontroller 802. The thermoelectric pad individually addresses each active waveguide and is activated independently by a different electrode 804. All the electrodes 804 are controlled by central microcontroller 802 in order to ensure optimal phase-shift control. The feed-back is obtained by maximizing the output power.

Since these materials, such as metallic electrodes, might also absorb some of the waveguide power, the heater pad must be located in a region where the light power density is the lowest. For example, when the system is an amplifier, the heater pad is preferably as close as possible to the seeder itself.

In the second embodiment the heat is generated by the pump laser itself. Each active waveguide is pumped by one or several diodes through the pumping waveguide network. Part of the pumping energy is necessarily transformed to heat, for example, because of the quantum defect between the pump and the signal wavelengths. In this embodiment, the glass wafer is actively cooled. For example, the top layer of the wafer can be coated with a diamond coating which is both transparent and excellent heat conductor. In such a case, heat generated by the pump within the active waveguide does not spread across the wafer but remains relatively limited to the extent of the waveguide itself. A modulation as small as a few percents of the diode power is in that case enough to modify the optical path by at least one wavelength.

Finally the output waveguide is coupled with an optical fiber 803 so that easy beam delivery can be provided. The coupling can be butt coupling with direct fusion of the fiber with the waveguide or alternatively traditional coupling using coupling optics.

EXAMPLES

Example 1

Pumping Scheme

The example is displayed in FIG. 5. A doped silica single mode waveguide 530 (10 microns wide by 10 microns thick) is embedded within the multimode director clad waveguide 520 (100 microns wide by 30 microns thick). The length of the waveguides is 8 cm. Secondary pumping waveguides 511, 512, 513, 514 couple into the waveguide 520 respectively every 16 mm. The distance between the pump diodes is 500 microns. Pump light is absorbed by the active single mode waveguide. In FIG. 6, the pump power in the director waveguide is displayed, as well as the power in the different secondary waveguides. When the amount of pump light in the director waveguide is too low (here 50% of the maximum amount), light from the secondary waveguide is added. Finally the amount of light in the director waveguide is always above a minimum value.

Example 2

Phase Control Using Heater Pads

Figure 9:
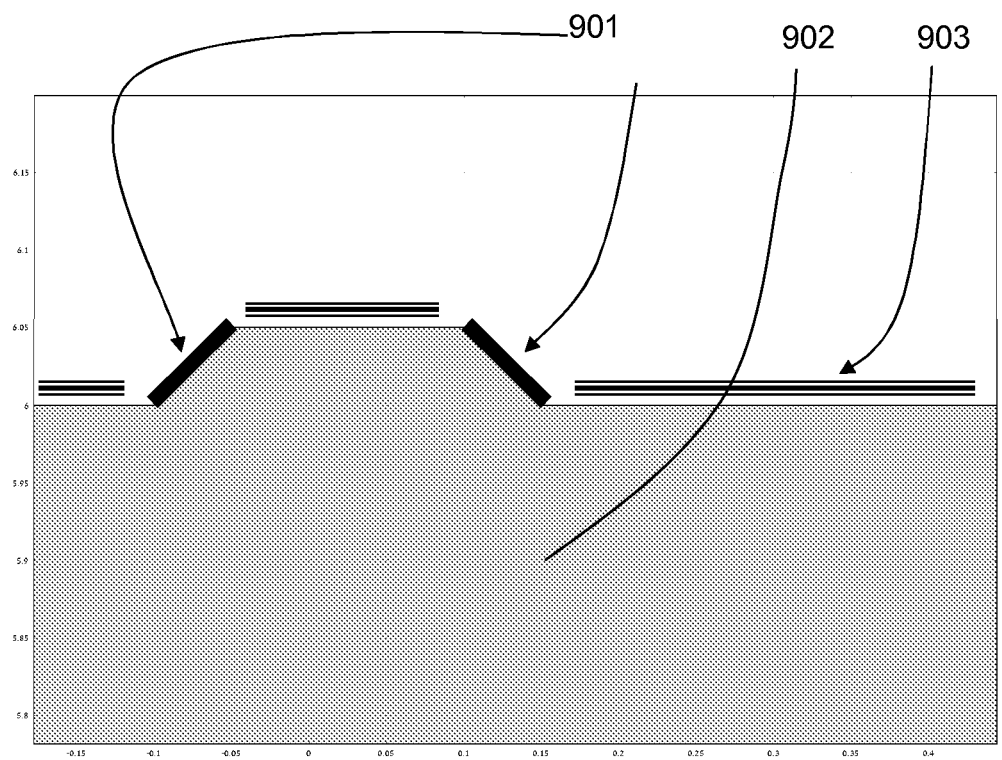
FIG. 9 is a simplified illustration of a simulated fused silica waveguide.

The structure is illustrated in FIG. 9. The effect of heater pads on the waveguide was investigated. The height is 50 microns, the base width is 250 microns and the top width is 150 microns. The pump waveguide is entirely embedded within the bulk glass 902. The heater pads 901 are on both sides of the structure. The rest of the structure boundaries 903 are maintained at a fixed temperature (in the simulations 25°). In this configuration, heater pads are far from the region where light is propagating.

Figure 10:
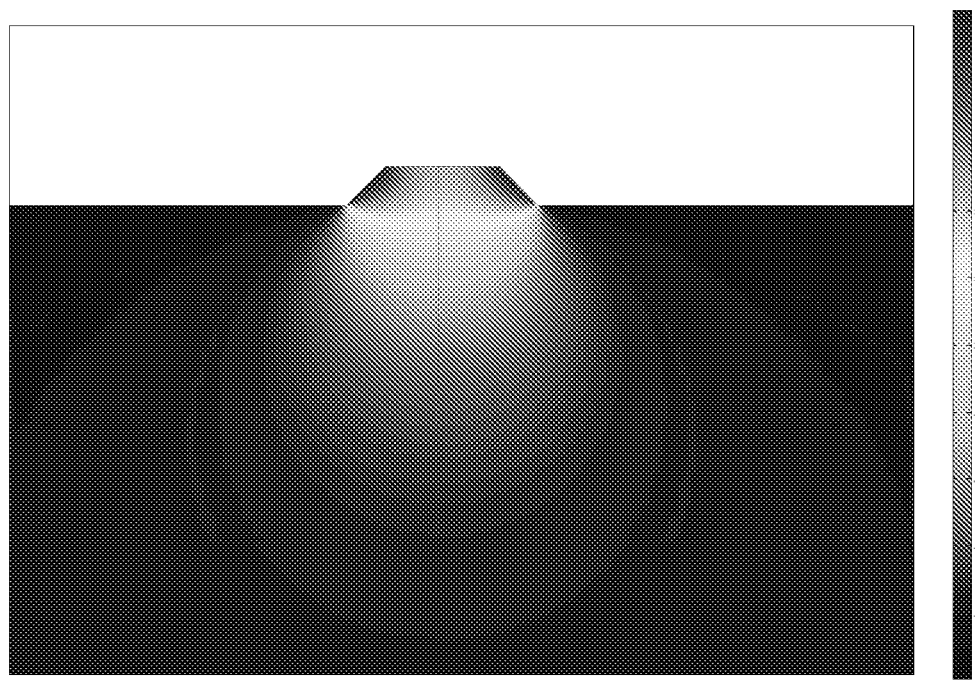
FIG. 10 is a simplified illustration of simulation of the temperature field within the waveguide region.

Simulation with a 10° difference between the electrodes and the rest of the boundaries shows a temperature difference of 7° at the center of the waveguide, with a large region of almost flat temperature around it. In FIG. 10 the temperature field is displayed. For an applied temperature gradient of 10° on the electrodes respective to the ambient temperature, 7° gradient is obtained at the waveguide center.

Figure 11:
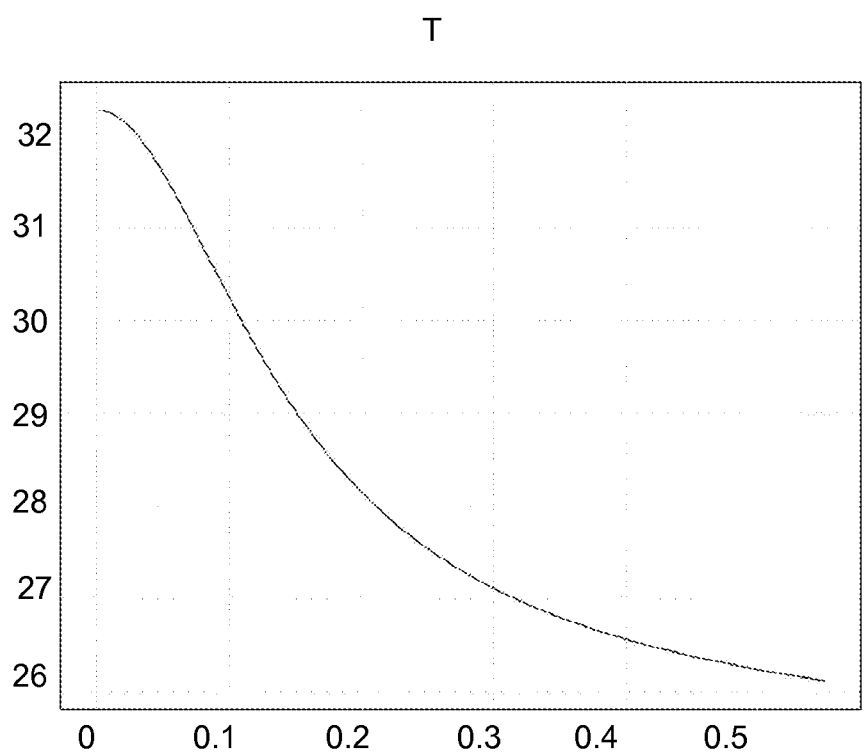
FIG. 11 is a simplified illustration of the temperature profile along the transverse direction (from the surface to the substrate).

The temperature profile along the z-direction (from the surface down to the substrate) is displayed in FIG. 11. It shows that the temperature gradient from the surface to the basis of the parallelepiped is less than 1° C. Similarly, a cross-section at the waveguide location shows that the temperature gradient over the whole waveguide is less than 0.2° C.

Figure 12:
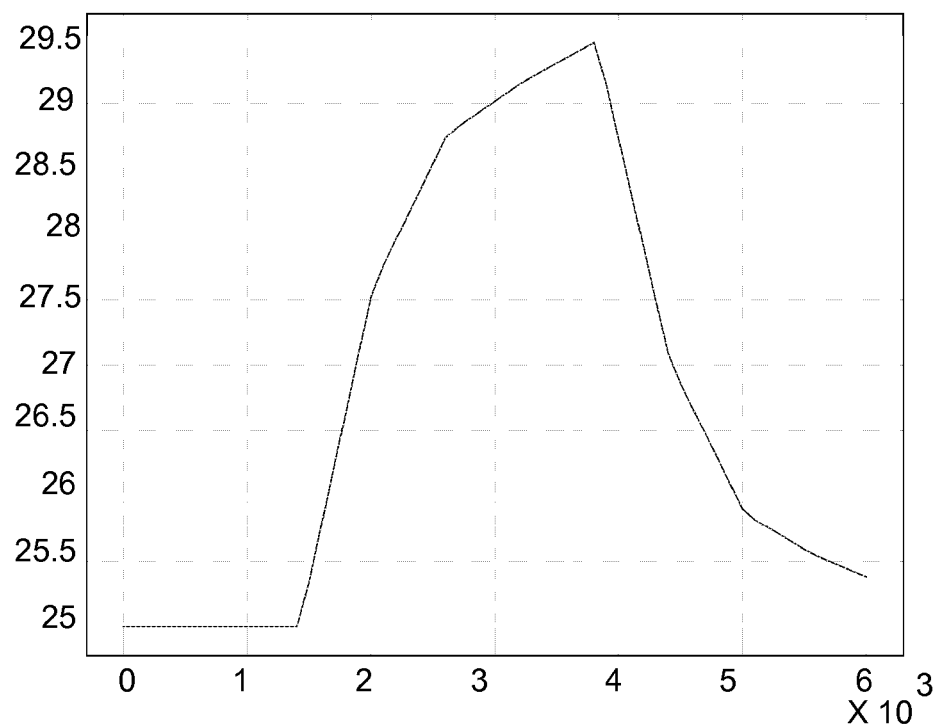
FIG. 12 is a simplified illustration of the dynamics of the temperature at the waveguide location.
Figure 13:
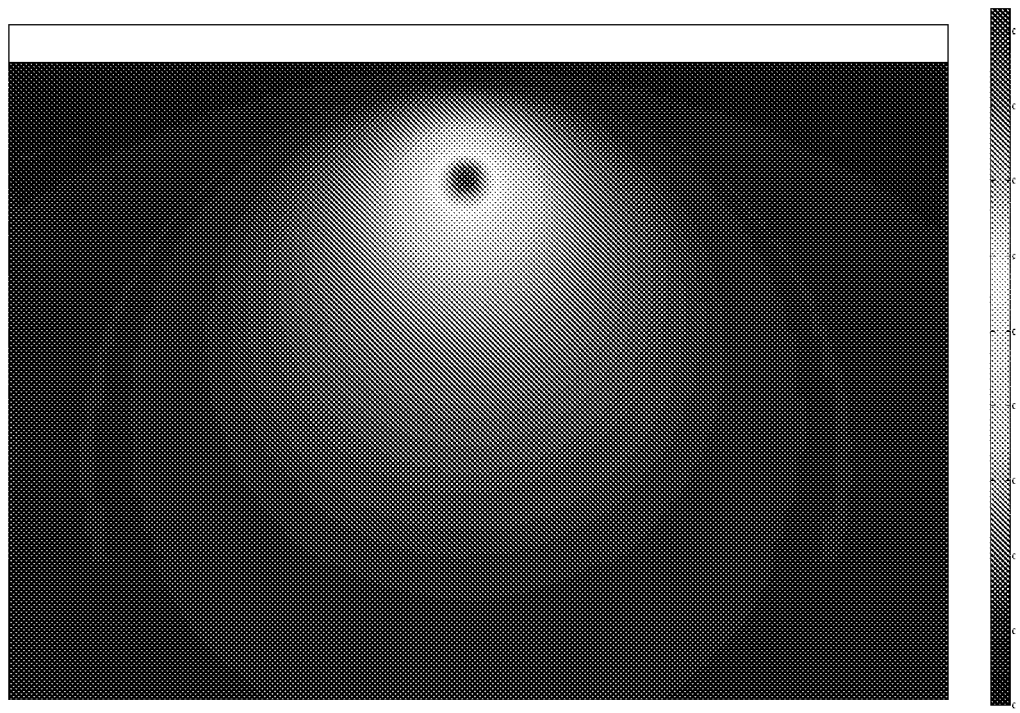
FIG. 13 is a simplified illustration of simulation of the temperature field within the waveguide region when heat is generated by the pump laser itself.

Switching capacity (on and off): A temperature dynamics simulation at the waveguide location (FIG. 12) shows that the switching time is less than 4 milliseconds. This is a short enough time for controlling the effect of external temperature gradient changes.

A change of 1 degree for a waveguide of 10 cm length leads to a phase change of $dn/dT*\Delta T*L/\lambda*2\pi = 1.28*1*10^{-5}*10/10^{-4}*2\pi = 1.28*2\pi$ This shows that this scheme is very well adapted for controlling the local phase.

It should be noted that in that scheme, the influence of a waveguide on the other (cross-talk) is particularly small. This is a major advantage.

Finally, this structure can be obtained using standard HF (hydrofluoric acid) etching. The slopped walls are naturally obtained by HF under-etching due to glass isotropic etching behavior. Alternatively the configuration shown in FIG. 14D can be obtained using standard etching techniques.

Example 3

Phase Control by Pump Beam Modulation

In this example heat is generated by the pump laser itself. In this case, the glass wafer is actively cooled. Each active waveguide is pumped by one or several diodes through the pumping waveguide network.

When the pump beam is absorbed by the ytterbium doped glass, part of the energy is transformed into heat. This corresponds to the quantum defect. The relative amount of lost energy is $$\eta = \left|\frac{h\Delta v}{hv}\right| = \frac{\Delta \lambda}{\lambda} = \frac{1030 - 970}{970} \approx 6\%.$$

This amount of heat generates a change in the temperature: the temperature inside the waveguide is higher than outside.

This change in temperature is (statically) determined by the stationary heat transfer equation:

$$-k\Delta T = q + h(T_{ext} - T)$$

k is the thermal conductivity in W/m/K, h is the convective heat transfer coefficient in W/(m²K). q is the heat density (in W/m³) generated within the medium through light absorption (quantum defect). The first term corresponds to heat conduction. The third term is usually adequate for energy transfer through plates and is not relevant here. Heat radiation is neglected here because the temperatures are relatively low.

The equation can be read:

$$-k\Delta T = q$$

We are simulating first the generation of heat due to the pump beam. We are particularly interested in the temperature change within the waveguide as a function of the pump power.

We can express the problem directly as a differential problem due to the linearity of the differential equation:

$$-k\Delta\delta T = \delta q$$

where we express the change in the temperature due to the change in heat generation.

The boundary condition is therefore $\delta T = 0$.

The heat source term is evaluated the following way: the laser is pumped by an overall power $P_p$, out of it $\eta P_p$ is transformed into heat. If the waveguide dimensions are $a*b*L$, then the heat density is $$\frac{\eta P_p}{abL},$$

and the differential heat density is $$\delta q = \frac{\eta \delta P_p}{abL}.$$

As an example, let us consider 1 Watts pumping difference over a 50 cm distance, and a 20×20 microns waveguide. It is generating:

$$\frac{0.06 \times 1}{50 \times 20 \cdot 10^{-4} \times 20 \cdot 10^{-4}} = 300 \text{ W/cm}^3$$

We use this value as input parameter for q. The other parameter is the thermal conductivity of glass, equal to $1.38 \cdot 10^{-2}$ W/cm/K.

Simulation of this situation is shown below:

The maximum temperature variation occurs in the middle of the waveguide, and equals to $4.6 \cdot 10^{-2}$ K.

Two physical effects contribute to the phase change: dilatation and refractive index temperature dependence:

$$\delta\varphi = \frac{nl}{\lambda}\left[\frac{1}{l}\frac{\partial l}{\partial T} + \frac{1}{n}\frac{\partial n}{\partial T}\right]\delta T$$

The thermal expansion coefficient $$\frac{1}{l}\frac{\partial l}{\partial T} = 5.5 \cdot 10^{-7} \text{ K}^{-1}$$

and $$\frac{\partial n}{\partial T} = 1.28 \cdot 10^{-5} \text{ K}^{-1}.$$

The main effect is the refractive index temperature change, and the phase change is:

$$\delta\varphi = \frac{l}{\lambda}\frac{\partial n}{\partial T}\delta T = \frac{50}{10^{-4}} 1.28 \cdot 10^{-5} \times 4.6 \cdot 10^{-2} = 0.29 \approx \frac{\pi}{10}$$

Therefore, a 10 W modulation of the pump is generating a phase change of π over a 50 cm distance.

For a realistic high power laser, the waveguide length is about 5 m, and the pump is coupled to a large waveguide (double clad) 200 microns width. The pump is 100 W, so 10 W represents a pump variation of about 10%, leading to an intensity variation of about 10% as well. Assuming 100 parallel waveguides, this corresponds to an intensity noise of 10 %/sqrt(10)~3%.

This scheme is particularly advantageous for high power lasers, since on the one hand one wants to avoid absorption at the electrodes (even if the electrodes are far from the waveguide center, part of the light will necessarily be absorbed at the electrodes), and on the other hand, high power is translated into high absorption and therefore stronger effect.

In FIGS. 14A-14D, different waveguide structure configurations for phase modulation are presented. The elements include glass substrate 1401, pump waveguide 1402, core waveguide 1403, upper cover glass 1404, heat spreading and dissipation layer 1405, thin diamond layer 1410 for heat spreading, heat dissipation surface 1421 (constant temperature), heater pads 1422 and heater pads 1431.

Figure 14A:
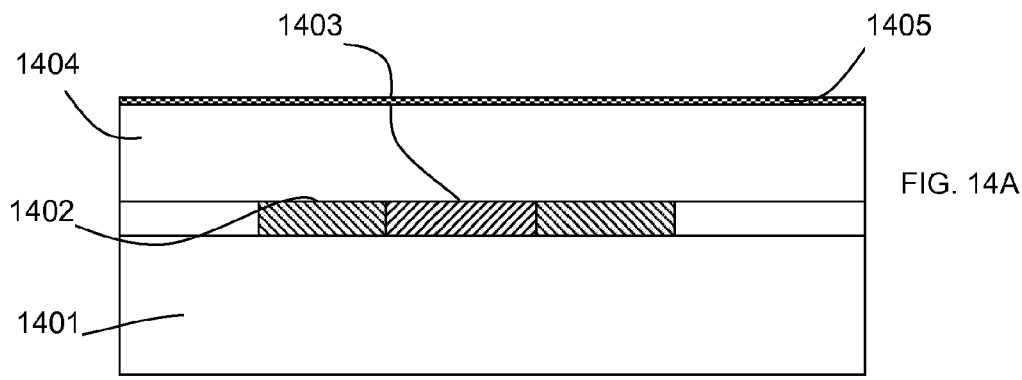
FIGS. 14A-14D are simplified illustrations of different configurations of the waveguide structure for phase modulation control.

FIG. 14A illustrates modulation using light itself: a heat spreader and dissipation layer 1405 quickly removes stationary temperature gradients and eliminates the deposited heat.

Figure 14B:
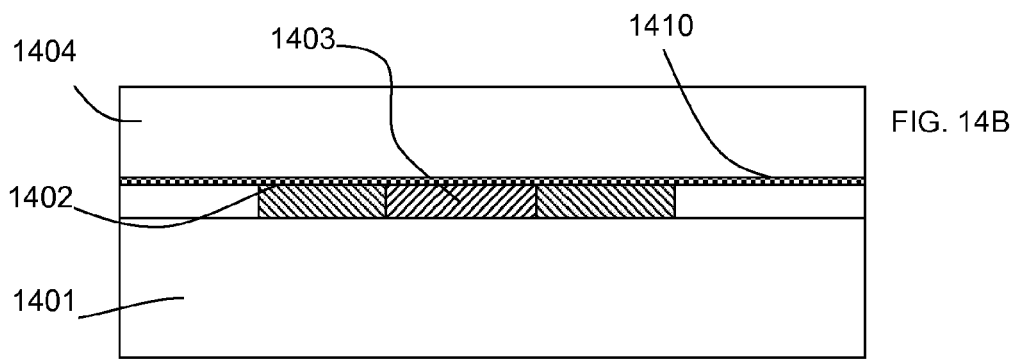

FIG. 14B illustrates the heat dissipation layer 1410 is directly in contact with the active waveguides. It can be for example a deposited diamond layer.

Figure 14C:
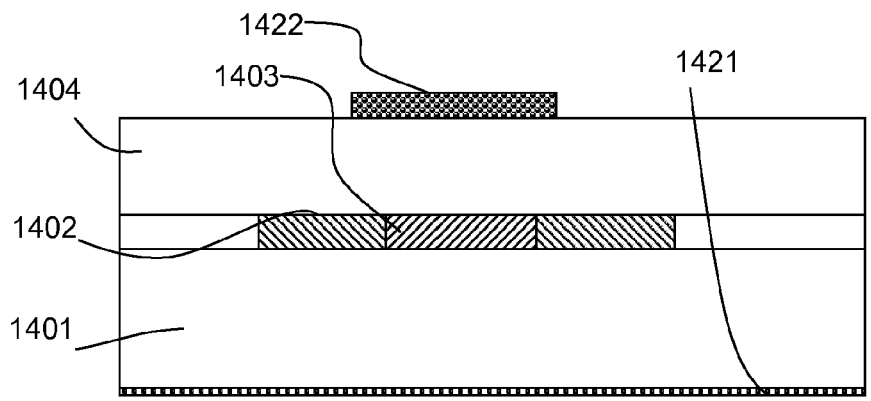

FIG. 14C illustrates the heat dissipation layer 1421 is located on one side of the device whereas the heater pad 1422 on the other side.

Figure 14D:
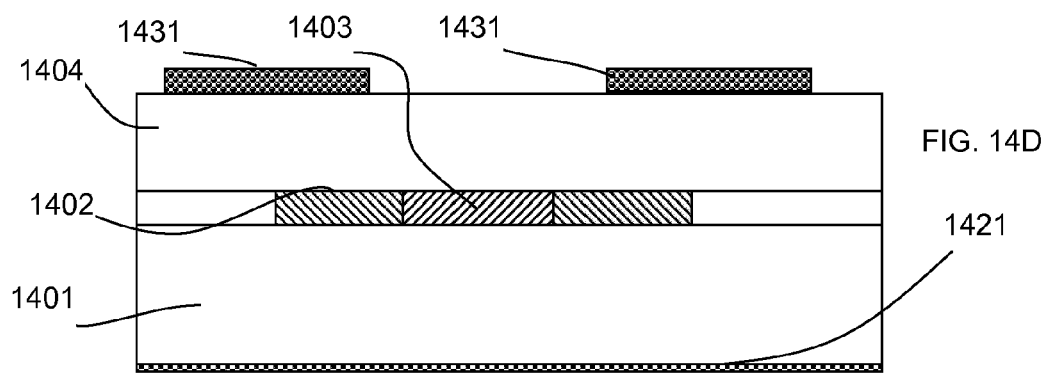

FIG. 14D is similar to FIG. 14C but two heater pads 1431 are used in order to increase the amount of heat in the core.

It will be appreciated by persons skilled in the art that the present invention is not limited by what has been particularly shown and described hereinabove. Rather the scope of the present invention includes both combinations and subcombinations of the features described hereinabove as well as modifications and variations thereof which would occur to a person of skill in the art upon reading the foregoing description and which are not in the prior art.

What is claimed is:

1. Apparatus comprising:
a waveguide amplifier comprising an input active optical waveguide containing rare-earth ions, embedded in a passive optical waveguide that guides pump power, and wherein light from said input active waveguide is split adiabatically into a plurality of branches, each of said branches comprising an output active waveguide embedded within a pumping waveguide, and wherein light is amplified in each of said branches independently but a phase relationship of the light between each of said branches remains approximately equal during propagation in each of said branches.

2. The apparatus according to claim 1, wherein said input active optical waveguide is single mode.

3. The apparatus according to claim 1, wherein an entire length of each of said output active waveguides is embedded within said pumping waveguide.

4. The apparatus according to claim 1, wherein a refractive index of each of said output active waveguides is higher than a refractive index of said pumping waveguide.

5. The apparatus according to claim 1, wherein light exiting said branches is recombined in free space.

6. The apparatus according to claim 1, wherein a high reflectivity mirror (HRM) is deposited on a facet of at least one of said branches and a medium reflectivity mirror (MRM) is deposited on a facet of said input active waveguide, and light is reflected back from said branches and exits through said input active waveguide.

7. The apparatus according to claim 1, wherein light from said branches is recombined in a waveguide segment and reflected back from said branches and exits through said input active waveguide.

8. The apparatus according to claim 1, wherein said passive optical waveguide comprises a central multimode waveguide in which said input active optical waveguide is embedded, and the apparatus further comprises a plurality of pump diodes coupled respectively in a plurality of multimode waveguides, wherein pump light from said multimode waveguides is coupled into said central multimode waveguide.

9. The apparatus according to claim 1, comprising a heater for heating said input active waveguide.

10. The apparatus according to claim 1, wherein said branches end as a comb forming a phase array.

11. The apparatus according to claim 1, wherein a high reflectivity mirror is deposited on at least one facet of the output active waveguides and a medium reflectivity mirror is deposited on a facet of the input active optical waveguide.

12. The apparatus according to claim 1, wherein the output active waveguides comprise a double tree, wherein after the light is split into said branches, the light is recombined at a waveguide segment and reflected back into said input active optical waveguide.

* * * * *